US008666655B2

(12) United States Patent  
Shtukater

(10) Patent No.: US 8,666,655 B2  
(45) Date of Patent: Mar. 4, 2014

(54) SYSTEMS AND METHODS FOR NAVIGATION

(76) Inventor: Aleksandr Shtukater, Fairlawn, NJ (US)

( * ) Notice: Subject to any disclaimer, the term of this patent is extended or adjusted under 35 U.S.C. 154(b) by 0 days.

(21) Appl. No.: 13/561,726

(22) Filed: Jul. 30, 2012

(65) Prior Publication Data

US 2014/0032099 A1   Jan. 30, 2014

(51) Int. Cl.
*G01C 21/00*   (2006.01)

(52) U.S. Cl.
USPC ........................................................... 701/428

(58) Field of Classification Search
USPC .................... 701/428–436, 528, 533
See application file for complete search history.

(56) References Cited

U.S. PATENT DOCUMENTS

| | | | |
|---|---|---|---|
| 5,627,915 A * | 5/1997 | Rosser et al. | 382/219 |
| 6,285,317 B1 | 9/2001 | Ong | |
| 7,010,033 B2 * | 3/2006 | Clark | 375/240.01 |
| 7,471,292 B2 | 12/2008 | Li | |
| 7,949,150 B2 * | 5/2011 | Haering et al. | 382/103 |
| 8,180,567 B2 * | 5/2012 | Geelen et al. | 701/431 |
| 8,352,180 B2 * | 1/2013 | Geelen et al. | 701/431 |
| 8,352,181 B2 * | 1/2013 | Hagiwara | 701/436 |
| 2003/0160153 A1 * | 8/2003 | Hara et al. | 250/214 VT |
| 2004/0179104 A1 * | 9/2004 | Benton | 348/207.99 |
| 2004/0236506 A1 * | 11/2004 | Kolb et al. | 701/208 |
| 2006/0230427 A1 * | 10/2006 | Kunkel et al. | 725/133 |
| 2008/0240616 A1 * | 10/2008 | Haering et al. | 382/294 |
| 2008/0253685 A1 | 10/2008 | Kuranov et al. | |
| 2009/0125234 A1 * | 5/2009 | Geelen et al. | 701/209 |
| 2009/0254268 A1 * | 10/2009 | Figueroa | 701/201 |
| 2011/0074926 A1 | 3/2011 | Khan et al. | |
| 2011/0096832 A1 | 4/2011 | Zhang et al. | |
| 2011/0103651 A1 | 5/2011 | Nowak et al. | |
| 2012/0191346 A1 * | 7/2012 | Geelen et al. | 701/526 |

* cited by examiner

*Primary Examiner* — Mary Cheung
*Assistant Examiner* — Anne Mazzara
(74) *Attorney, Agent, or Firm* — Feldman Gale, P.A.; Rafael Perez-Pineiro; A. Robert Weaver

(57) ABSTRACT

The present invention relates to a navigation device. The navigation device is arranged to dynamically generate multi-dimensional (multidimensional) video signals based on location and directional information of the navigation device by processing at least one source video signal. The navigation device is further arranged to superimpose navigation directions and/or environment information about surrounding objects onto the generated multidimensional video feed.

20 Claims, 6 Drawing Sheets

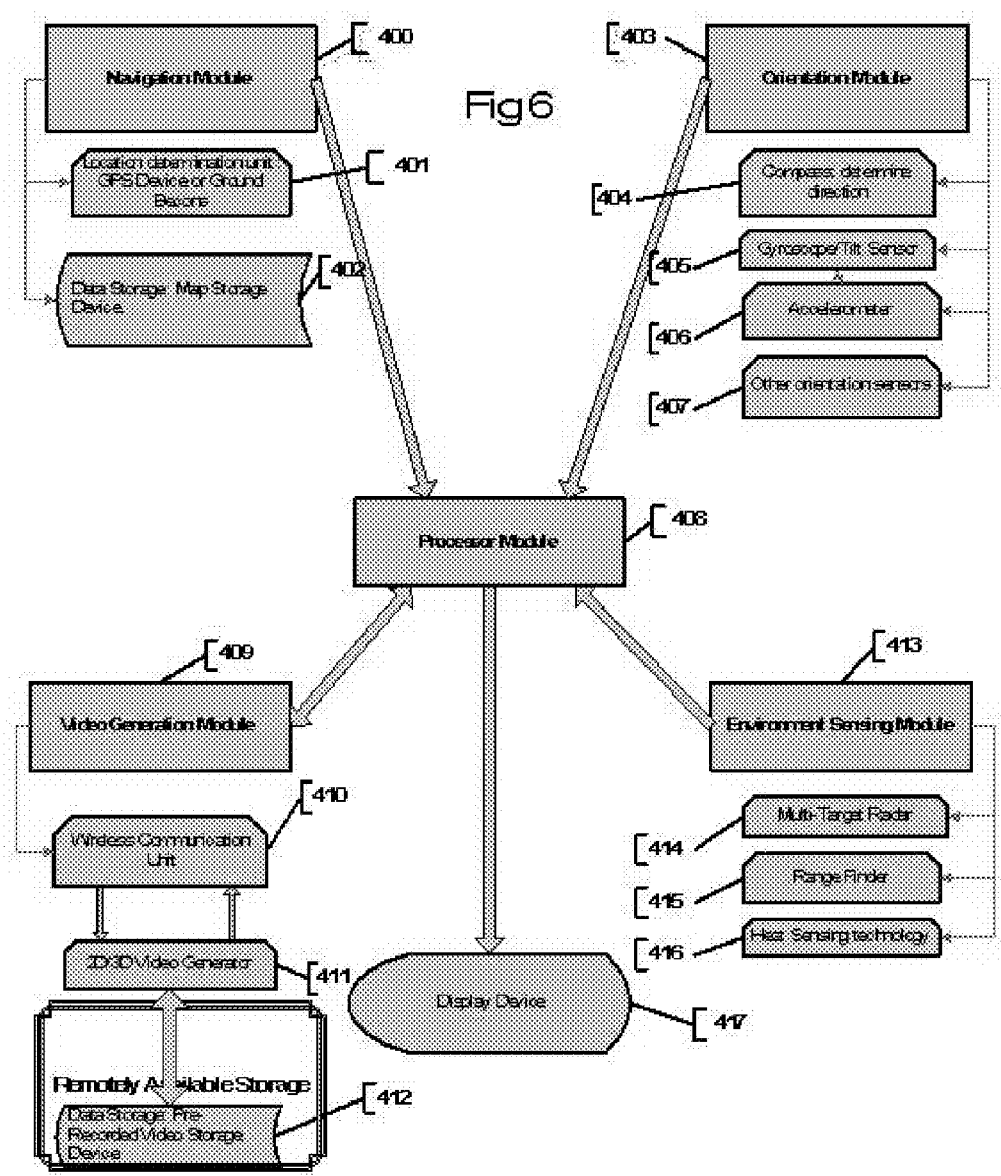

SYSTEMS AND METHODS FOR NAVIGATION

BACKGROUND OF THE INVENTION

Embodiments of the present invention generally relate to systems and methods for navigation and more particularly to systems and methods for a GPS-based or wireless location-detection (e.g., ground based beacons, distance measurement sensors, etc.) navigation.

In our contemporary fast-paced world, navigation systems have become more popular and readily available. As inter and intra country travel has increased rapidly, the travelers need a variety of information in order to navigate safely and efficiently. The information needed for safe and efficient navigation may include the traveler's position at a given time, the traveler's direction of travel relative to a planned course of travel, the traveler's position relative to visible hazards, the visibility around the traveler's surrounding, and the like. The existing navigational systems fail to provide adequate information needed for safe and efficient navigation.

Prior art navigation devices are mostly GPS-based and are well known and widely used as consumer devices, for example as car navigation devices, and marine and submarine navigation systems. Such navigation devices are usually combined with computing units externally or integrally connected to the navigation device. Prior art systems may also include an associated navigation map storage integrated with a computing unit, with the computing unit operating to a) plot or compute an optimal or best route from the source address or location to a target address or location, b) monitor and keep track of current position relative to the plotted or computed navigation route, c) re-compute or re-plot an optimal or best route whenever necessary.

Currently available navigation systems are integrated with a display device and use various methods to display location and navigation information. Modern navigation devices display sections of stored map pictograms corresponding to a current location, as well as navigation directions in the form of visual and/or audible helpers. Visual helpers may include graphical signatures such as arrows, status bars indicators of upcoming turnings or junctions, and so forth. In prior art systems, such schematic and abstract representations of the real world require users of a navigation device to interpret a picture view depicted on the display and visually associate it with real world surroundings.

Over the years the navigation systems have evolved from simple geometrical displaying of road centerlines to providing overlaid images to help users navigate. However, the existing navigational systems may be improved to provide enhanced navigational view with features to assist drivers while driving at night or in low visibility conditions. Moreover, the existing navigational systems may be improved to provide information regarding the surrounding of a traveler, thus enhancing safe navigation.

Therefore, a need exists for an improved navigational system and method that provides a tool to allow safer navigation for a traveler while being efficient.

SUMMARY OF THE INVENTION

The following presents a simplified summary of the invention in order to provide a basic understanding of some aspects of the invention. This summary is not an extensive overview of the invention. Rather than specifically identify key or critical elements of the invention or to delineate the scope of the invention, its purpose, inter alia, is to present some concepts of the invention in a simplified form as a prelude to the more detailed description that is presented later.

In accordance with one embodiment, a navigation system for travelers is presented. The navigation system, in one embodiment, comprises an information module. The information module gathers information from a plurality of sources. For example, the information module gathers information from a source such as a position determination module, implemented as a GPS device or alternatively based on ground based beacons, distance measurement devices, etc. As a user navigates, the information module may receive, through a communications module, one or more video feeds from the remote data source corresponding to a GPS reading, for example, whereby the information module causes the navigation system to display generated video of the current location. In one embodiment, the one or more video feeds are processed either remotely or locally by the information module, such that non-stationary and some stationary objects in the video are removed before being displayed to the user of the navigation system. For example, if the original video (also referred herein as a "source" video) recorded included cars parked on a street, the system can remove the images of these stationary cars before being displayed to the user as the user navigates. In one embodiment of the invention, the video signal received by the information module may include a combination of video feeds, where the video feeds are combined at a remote server to generate multi-dimensional video for a specific location and directional orientation parameters provided, to provide a broader video perspective from adjacent places or views. The source video feeds may reside in a data bank stored by the remote server. In one embodiment, generated video could be two dimensional. In another embodiment video generated could be a three dimensional video. In another embodiment, video generated could be generated as a FTV (free viewpoint video/television) or any other video generation and processing can be used.

In one embodiment of the invention, the navigational system includes a camera that records video of a navigation path together with corresponding location provided by a location determination module. The recorded source video feed may then be uploaded to the remote data bank so that users can collaborate with the addition of source video information that may then be further processed and used by other users as source video. The recorded source video feed can be GEO enhanced with corresponding coordinate information and directional orientation of recording as well as time stamp information and camera parameters. In one embodiment of the subject matter disclosed herein, the video camera may capture a two or three dimensional video signal to be uploaded to the remote server or can be stored locally by the onboard navigation device.

In one embodiment of the present invention, a navigation system is provided, either as a standalone navigation device or as an integrated system for personal digital assistants, mobile telephones, or any other type of hand held or mobile device. The navigation system may include an apparatus, and corresponding method, for providing navigation directions in the form of dynamically or synthetically generated multidimensional video. The multidimensional video may be generated as free view point video with superimposed navigation instructions or environment information, for example. In accordance with one embodiment, the navigation system integrates dynamically generated multidimensional video, generated based on a current location of the navigation device as well as its orientation, and navigation instructions computed by the navigation device. One aspect of the present invention includes the display of a video signal generated based on pre-recorded source video corresponding to the location and orientation of the navigation device, such that, for example, in low light conditions a video view is generated for a given coordinate (x, y, z) and displayed together with an overlay of navigation instructions.

Another aspect of the invention involves use of an environment sensing module providing information about objects nearby a navigation path and a processing module that integrates all the inputs into one usable view. The environment sensing module may determine the location, size and/or shapes of objects in the vicinity of the navigation device. In one embodiment, the speed of non-stationary objects may also be determined.

In another embodiment, information derived from the environment sensing module may be superimposed onto a generated or pregenerated video signal to produce a complete picture of the surrounding environment even without navigation directions being provided. In that embodiment the navigation device serves as an observational navigation tool. In an alternative embodiment, environment information may be used in conjunction with navigation instructions superimposed onto a pre-generated or generated video signal] video signal to provide a complete navigation solution for low visibility conditions.

In another embodiment, the navigation system comprises a user interface. The user interface enables the user to communicate with the navigation system and vice versa. In an alternate embodiment, the information module may get information from an orientation module. For example, the orientation module may comprise a compass. The compass may provide information to the navigation system to determine a direction of the navigation system's motion. Alternatively, the orientation module may comprise a gyroscope. The gyroscope may be used to determine tilt of the navigation system. Alternatively, the gyroscope may be used to determine the orientation of the navigation system, the traveler, or a vehicle on which the gyroscope may be alternatively mounted.

In another embodiment of the subject matter disclosed herein, the navigation system may further comprise an accelerometer. For example, the accelerometer may be used to calculate the acceleration of the navigation system. In another embodiment, the information module may get information from an environment sensing module. The environment sensing module may comprise a multi-target radar, a range finder, light sensor and a heat sensing sensor.

In one embodiment of the present invention, a navigation device includes a video generation module, which in turn may include an onboard, integrated wireless communication unit to access a remotely or wirelessly available video generator service. One function of the wireless communication unit is to request, from a remotely located and wirelessly accessible video generator, a multidimensional video stream, such as 2D or 3D video, generated remotely in real-time, based on a combination of current location and directional orientation information produced by the navigation and orientation modules. The generated multidimensional video stream is wirelessly fed back to the navigation device through the wireless communication unit, which, in turn passes the received generated video signal to the processor module for further processing and for subsequent output to the display device.

In one embodiment of the present invention, a navigation device includes a video generation module which is in turn comprised of an onboard, integrated wireless communication unit and an integrated, onboard multidimensional video generator. The communication unit is further arranged to wirelessly fetch a plurality of prerecorded multidimensional source video feeds from a remote, wirelessly available video storage. The remote video storage may service requests from the wireless communication unit by sending back a plurality of prerecorded multidimensional source video stream(s) corresponding to the space adjacent to the location coordinates derived from the navigation module. A prerecorded multidimensional video stream may be used as the source video feed for further video generation in the multidimensional video generator. The video generator subsequently generates video for current location and current directional orientation.

In one embodiment of the present invention, a navigation device may include video generation module, which is in turn comprised of an onboard multidimensional video generator and onboard, integrated data storage of pre-recorded multidimensional source video(s). The video generation module may be configured to generate a video view for a requested location and directional orientation by reading from the data storage pre-recorded source video corresponding to the space adjacent to the current location and subsequently generating video for a current location and a current directional orientation.

In accordance with one embodiment, a method for navigating a traveler is provided. The method may comprise configuring a user interface for communicating with a navigation system user. The method may also comprise configuring a processing module to process data from at least one of an information module and a user interface.

The method for navigating may further comprise configuring the information module to get information from an orientation module. For example, the orientation module may be configured to determine direction, or to determine tilt, or to determine vibration, or to determine acceleration of motion. The method for navigating further comprises configuring the information module to gather information from an environment sensing module. In one embodiment, the method for navigating comprises configuring the environment sensing module to gather information from a multi-target radar, a range finder, and a heat sensing sensor.

One object of the present invention is to provide a more objective or realistic view of surroundings that requires less visual interpretation from the user, especially when navigating at night time or under low visibility conditions. Another object of the invention is to enable safe driving, intelligent highway safety systems, accident avoidance, accident elimination, collision avoidance, blind spot detection, anticipatory sensing, automatic vehicle control, and intelligent cruise control. Another object of the present invention is to provide a navigation or observation tool for low visibility conditions in the air, on the road and under water. The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

FIG. 6 illustrates another alternate embodiment of the navigation system of the present invention.

DETAILED DESCRIPTION

Figure 1:
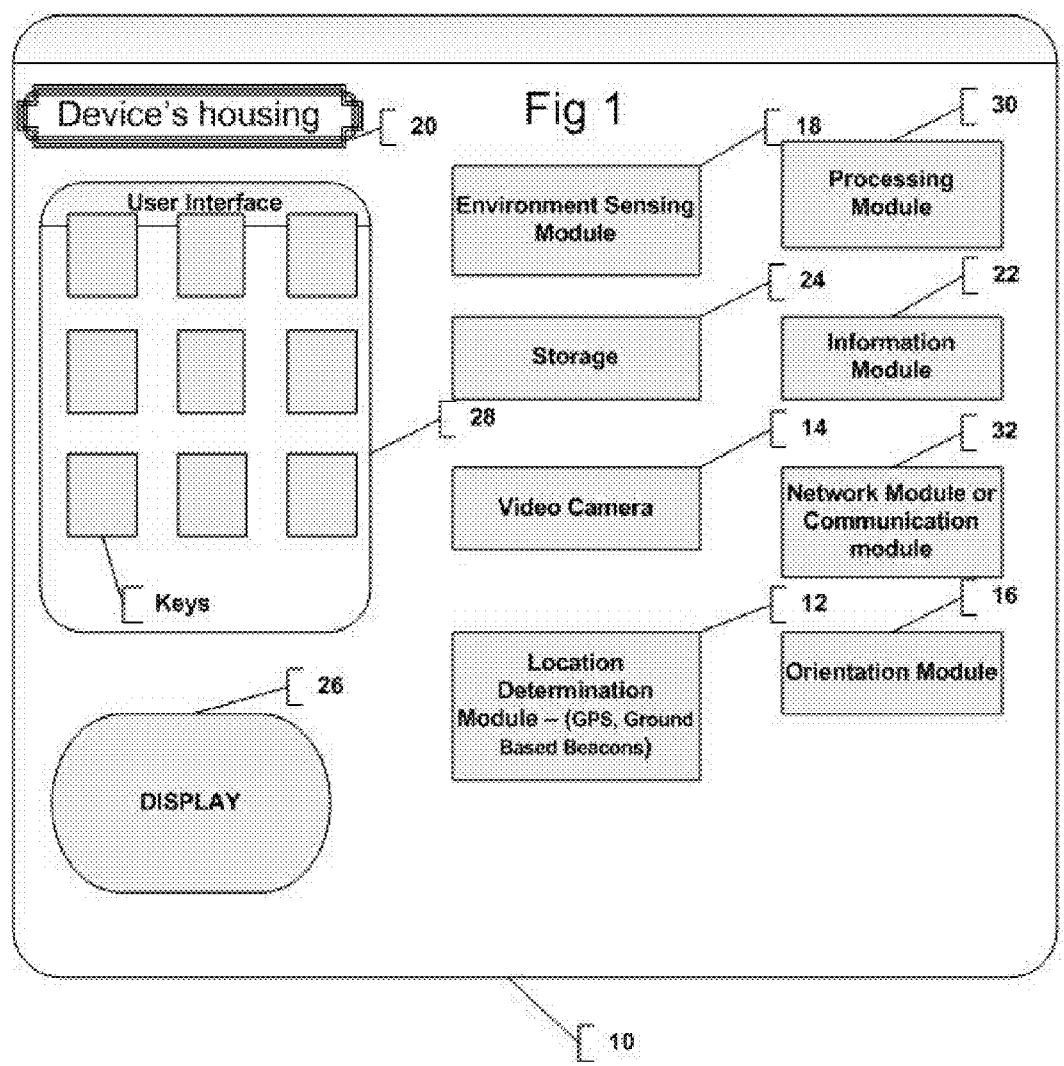
FIG. 1 illustrates a block diagram of a navigation system in accordance with an embodiment of the present invention.

The foregoing summary, as well as the following detailed description of certain embodiments of the subject matter set forth herein, will be better understood when read in conjunction with the appended drawings. As used herein, an element or step recited in the singular and preceded with the word "a" or "an" should be understood as not excluding the plural form of said elements or steps, unless such exclusion is explicitly stated. In this document, the term "or" is used to refer to a non-exclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, the term "video signal" or "video" includes any signal carrying information corresponding to an image or a frame, or sequence or frames of images, regardless of how the video signal is transmitted, for example, in digital or analog form, as streaming data, etc. Also, as used herein, the term "video generator" includes the generation of an image or a frame, or sequence or frames of images.

The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

The various embodiments and/or components, for example, the modules, elements, or components and controllers therein, also may be implemented as part of one or more computers or processors. The computer or processor may include a computing device, an input device, a display unit and an interface, for example, for accessing the Internet or Intranet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer". In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents.

FIG. 1 illustrates a block diagram of a navigation system 10 in accordance with an embodiment. The navigation system 10, in one embodiment, comprises an information module 22. The information module 22 gathers information from a plurality of sources. For example, the information module gathers information from a source such as a location determination module 12 that may determine location based on GPS, ground based beacons, or distance measurement sensors, for example. The location determination module 12 calculates the current position of the navigation system. For example, the location determination module 12 may communicate with a GPS satellite and determine the coordinates of the navigation system. Alternatively, in one embodiment of the subject matter disclosed herein, an enhanced reading of the GPS location information may be performed. Furthermore, the location may be cached to avoid interruptions in wireless service, for example. Also, for example, the information module 22 gathers information from a source such as a video camera 14. In one embodiment of the invention disclosed herein, the video camera 14 may capture and generate a two dimensional video signal. Alternatively, the video camera 14 may capture and generate a three dimensional video signal. In one embodiment, the video camera 14 may further have the capability to capture images at night time. In another embodiment, the video camera 14 may receive near-infrared light having a wavelength that is not visible to the human eye. Alternatively, the video camera 14 may use any other technology to photograph people and objects at night. Alternatively, the video camera 14 may be able to capture images at night time, or low light images in color. The video camera 14 may be attached to the navigation system itself or may be attached to the body of an automobile.

In an alternate embodiment, the information module 22 may get information to use for navigating from an orientation module 16. For example the orientation module 16 may comprise a compass. The compass may provide information to the navigation system to determine the direction of the navigation system's motion or trajectory. For example, the compass may indicate the direction that a user should take to reach a destination. Most importantly, the compass may be used to identify directional orientation and provide that directional orientation as input to a video generator module and obtain a generated video stream based on a combination of the current position and directional orientation. Furthermore, additional motion measurement devices may be provided. For example, a flux-gate compass may be provided in addition to the compass.

Alternatively, the orientation module may comprise a gyroscope. The gyroscope may be used to determine tilt of the navigation system. In an exemplary embodiment a gyroscope may be used to sense tilt rate on a plurality of axes. For example, the gyroscope is adapted to sense tilt in at least two axes. For example, the gyroscope may be adapted to sense tilt in at least three axes.

In another embodiment of the invention disclosed herein, the navigation system may further comprise an accelerometer. For example, the accelerometer may be used to calculate the acceleration of the navigation system in at least one coordinate. In another embodiment, the accelerometer may determine acceleration as a vector in four-dimensional space-time.

In another embodiment, the information module may get information from an environment sensing module 18. The environment sensing module 18 may gather information related to the condition data of the traveler's surrounding. In some embodiments, the information gathered by the environment module 18 may be stored in a database associated with the data bank of source video feeds, for example, in order to assist with the processing of stored source video feeds with respect to removal of stationary objects. For example, the database may be part of the environment sensing module. Alternatively, the database may be at a remote location outside of the navigation system. For example, the database may be on a cloud server. Alternatively, the information may be stored in local memory storage 24. In another embodiment, the environment sensing module 18 may be used to derive information about objects, their position, size, shape, speed, etc., which are in the vicinity of the navigation device. This information is further used to enrich generated multi-dimensional video signals. Information about objects is superimposed onto a pre-recorded source video feed with or without navigation instructions being superimposed, providing objective and realistic views of surroundings.

The environment sensing module 18 may further comprise a multi-target radar. In one embodiment of the subject matter disclosed herein, the radar may be integral to the environment sensing module, being housed within the navigation system housing 20. Alternatively, the radar may be external to the navigation system housing 20.

The environment sensing module 18 may further comprise a rangefinder. It should be noted that the term rangefinder may be used interchangeably with "telemeter." A rangefinder mechanism, as part of the navigation system, may allow the traveler to know a subject's distance from the navigation system. For example, the rangefinder may alert the traveler if there was a subject too close to the traveler. Additionally, the rangefinder may provide the traveler with actual distance measurements overlaid on a map on the display 26, showing where a subject is in the surrounding. Additionally, distance and range information from a rangefinder may be used by the processing module to determine spatial proportion and overlay position of the object detected by the environment sensing module 18 within a generated video image frame.

The environment sensing module 18 may further comprise a heat sensor. It should be noted that the heat sensor may be used interchangeably with thermal sensors or temperature sensors. In one embodiment, the navigation system may have a plurality of heat sensors. In an exemplary embodiment, the heat sensors as used in the subject matter disclosed herein may be used to measure the thermal radiant power of the infrared or optical radiation that they receive from a known or calculated area on the surface of an object being measured, or a known or calculated volume within the object. For example, the volume within the object may be measured where the object is semitransparent within the measuring wavelength of the heat sensor.

In accordance with one embodiment, a generated multidimensional video signal is input into the processor module and the processor module superimposes navigation instructions over the generated streaming video. Thus, a generated video stream combined with navigation instructions is fed to the display of the navigation device. Optionally, the navigation system can also be integrated with the environment sensing module with technologies such as multi-target radar, rangefinder, laser, etc. One function of the environment sensing module is to provide information about moving and stationary objects surrounding the location of the navigation apparatus. Information from the environment sensing module may also be superimposed onto the generated video feed.

Alternatively, in yet another embodiment, a generated multi-dimensional video feed is integrated with an output of the environment sensing module, without requiring navigation instructions to be overlaid on the generated video signal. In this embodiment, information about non-stationary objects in the vicinity of the navigation device is superimposed on a generated multidimensional video signal. In this implementation such navigation device becomes more of an observational tool and enables better visual orientation.

In one embodiment, environment information about surrounding objects can be correlated with the generated multi dimensional video signal, where the video image of the object can be analyzed using various known object recognition techniques. The resulting correlated signal may then be compared or further correlated with current environment information to determine which objects (fed from the environment information module) are present or absent in the generated feed. Objects which are absent from the original fed can be superimposed onto the video signal to be fed to the display module. Alternatively, the video signal can also be enhanced to carry descriptive, meta information about objects which are in a given image frame.

In another embodiment, the navigation system may comprise a user interface 28. The user interface enables the user to communicate with the navigation system and vice versa. In some embodiments, a typewriter-like keyboard of buttons (hard keys) may be included in the user interface. Alternatively, one or more soft keys may be included. The soft keys may be assigned functions in accordance with a mode of operation of the navigation system. Alternatively, the user interface may have hard keys, or soft keys, or any combination thereof. In one embodiment, a display 26 is provided to display images, video, maps, directions, text, or any combination thereof. Alternatively, a portion of the display may be devoted to labels for the soft keys.

In one embodiment, the navigation system comprises a processing module 30. The processing module 30 is configured to perform a plurality of processes. For example, the processing module processes data obtained from the information module 22. Alternatively, the processing module may also process data obtained from the user interface. In one embodiment, the processing module 30 may be configured to compute an optimal path for navigation.

The navigation system may be a handheld device or may be available as a fixture within an auto body. For example, the navigation system may be implemented either as a standalone navigation system or as an integrated system for PDA, hand held device or any other type of device that services the above mentioned purpose.

Additionally, in one embodiment, the navigation system may further include a communications module 32, also referred to herein as a network module 32. The network module is preferably a wireless communications module and may be part of the video generation module. The network module 32 may allow the navigation system to receive data to be used in navigation via a network. The network module 32 may allow the navigation system to relay data from the navigation system to a server or to a remote database in order to add to an existing data bank of source video feeds and navigational data. In one embodiment, the navigation system communicates data (e.g., download or upload data updates when the vehicle is parked) over a wired network. Alternatively, the navigation system may communicate data over a wireless network. For example, the data communicated from one navigation system may be shared or may be made accessible to a plurality of navigation systems.

One embodiment includes a wireless communication unit or module 32 and a remote, wirelessly available video generation service. The video generation service generates multidimensional video frames based on input parameters (current position and directional orientation) and at least one source video feed. The generated video frames are wirelessly fed back to the processing unit of the navigation system, via a wireless communication unit, for further processing. For example, directional instructions or environment information may be superimposed onto the generated video image and then output to the display.

Figure 2:
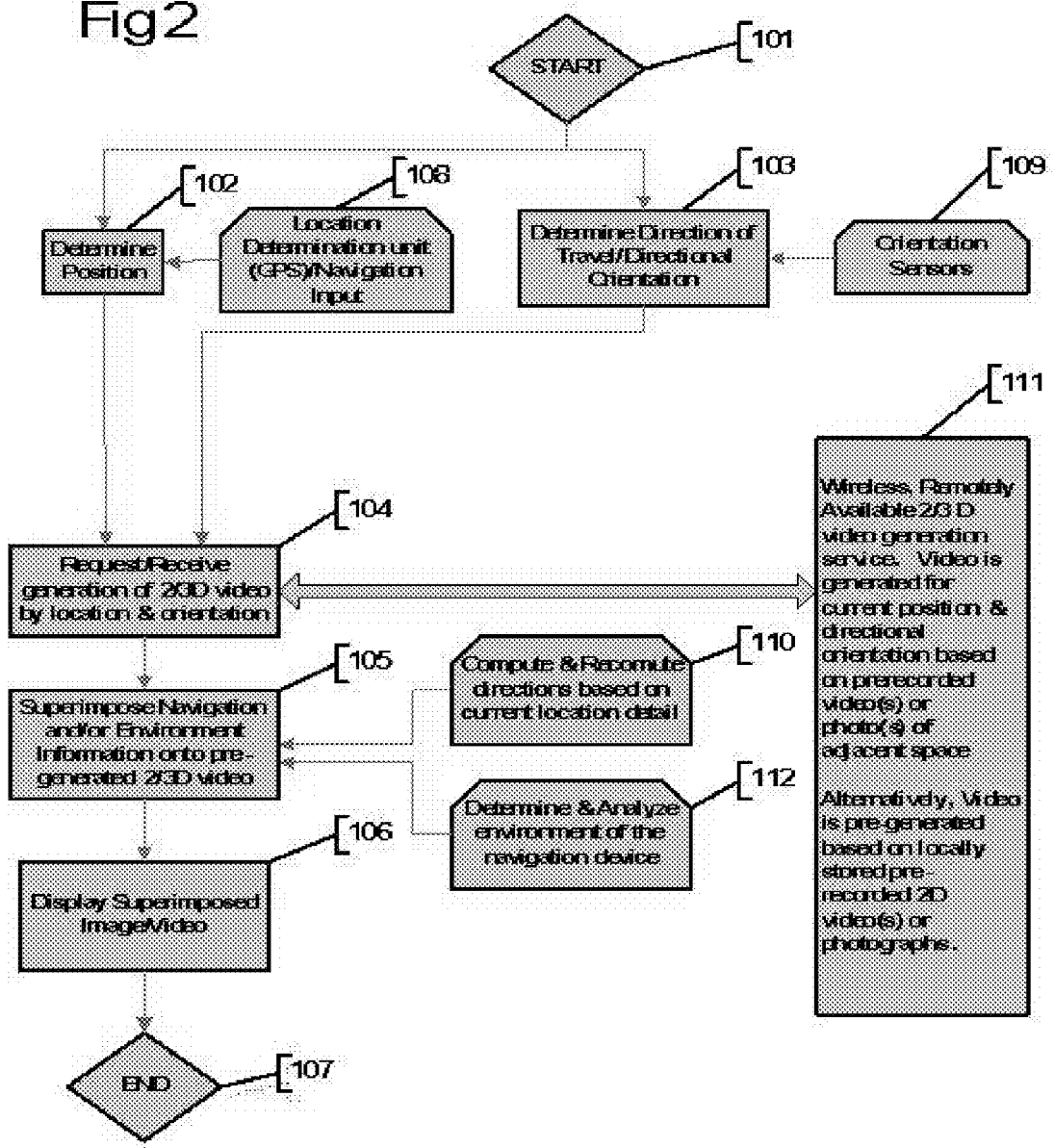
FIG. 2 is a process flow diagram illustrating a navigation display process in accordance with an embodiment of the present invention.

FIG. 2 is a flow chart illustrating a navigation display process in accordance with an embodiment. The process starts at 101. At 101 the process may include starting the navigation system or turning the navigation system to an "on" state. Alternatively, step 101 may also include a user entering a destination location in the navigation system using the user interface.

Step 102 includes determining a current position of the user. For example, the current position determination may be an absolute determination or a relative position determination. In an absolute coordinate determination, the navigation system may determine the position coordinates of the current position of the user. In a relative position determination, the navigation system may determine the current position of the user relative to, for example, a destination the user may enter.

The method for navigating may include configuring an information module to gather information from a plurality of sources. For example, the information module gathers information at 108 from a source such as a location determination module. The method may include configuring a location determination module, such as a GPS chip, to calculate the current position of the navigation system. The GPS chip may communicate with a GPS satellite and determine the coordinates of the navigation system. In one embodiment, the GPS may ensure accurate recognition of the position of a GPS terminal even when the signal may be affected by extrinsic noise. Alternatively, in one embodiment of the subject matter disclosed herein, an enhanced reading of the GPS location information may be performed. For example, the location determination module may be configured to detect a location based on signals received from cellular radio towers.

At 103 the process includes determining orientation. At 109 a plurality of orientation sensors may be used to provide orientation information to determine direction of travel and directional orientation. The orientation sensors may include a compass, gyroscope, or an accelerometer. In an alternate embodiment, an orientation module may be configured to provide information to the information module. The navigation module may be configured to use the orientation information for enhancing the navigation experience.

At 104 the process involves capturing streaming video signals (comprised of video frames) generated at 111 by a remote video generation service. The video is generated based on a request from the navigation system that includes the location and orientation data generated at 102 and 103. In response to the request from the navigation system, video may be generated for the current position and directional orientation based (for current view point) on prerecorded source videos or photos. In another embodiment, multidimensional video signals are generated based on pre-recorded 2D or 3D source videos or photographs stored locally in the navigation system.

Also, for example, the information module may be configured to gather information from a video camera. In one embodiment the video camera may capture a two dimensional source video signal. Alternatively, the video camera may capture a three dimensional source video signal. In one embodiment, the video camera may be configured to acquire images at night time. In another embodiment, the video camera may receive near-infrared light having a wavelength that is not visible to the human eye and capture an infrared image of an object based on the infrared signal. Alternatively, the video camera may use any other technology to photograph people and objects at night. Alternatively, the video camera may also be configured to capture low light images in color. The method may comprise attaching the video camera to the navigation system or the method may comprise attaching the video camera to the body of an automobile, with the video camera being electronically coupled with the navigation system. The source video signals from the camera may be uploaded to the remote video generation service.

At 105 the process includes processing the generated video signal for display at 106 to a user. The processing at 105 may include computing an optimal path for navigation. After a streaming multi-dimensional video signal is received from a remote server, and the navigation path generated for a specified position and orientation, in 105, navigation instructions are superimposed onto the generated video. Alternatively, the environment information, derived at 112, is superimposed over the generated video signal. At 105, the process may receive input from 110. At 110, the process may include computing and/or re-computing direction based on the current location information. After display 106 of the generated video signal, the process may end 107. The process termination 107 may include shutting down the navigation system or turning the navigation system to an "off" state. Alternatively, step 107 may also include a user entering an alternative destination location in the navigation systems using the user interface, that will reinitialize the process to step 101.

At 112, the process involves capturing current environment information and optionally overlaying this information over the generated multi-dimensional video signal. Environment information may include but is not limited to object sizes, object shapes, object's day light color, object's temperature, object's distance from navigation device and object's speed and vector of movement information for objects in the current surrounding of the navigation device.

Figure 3:
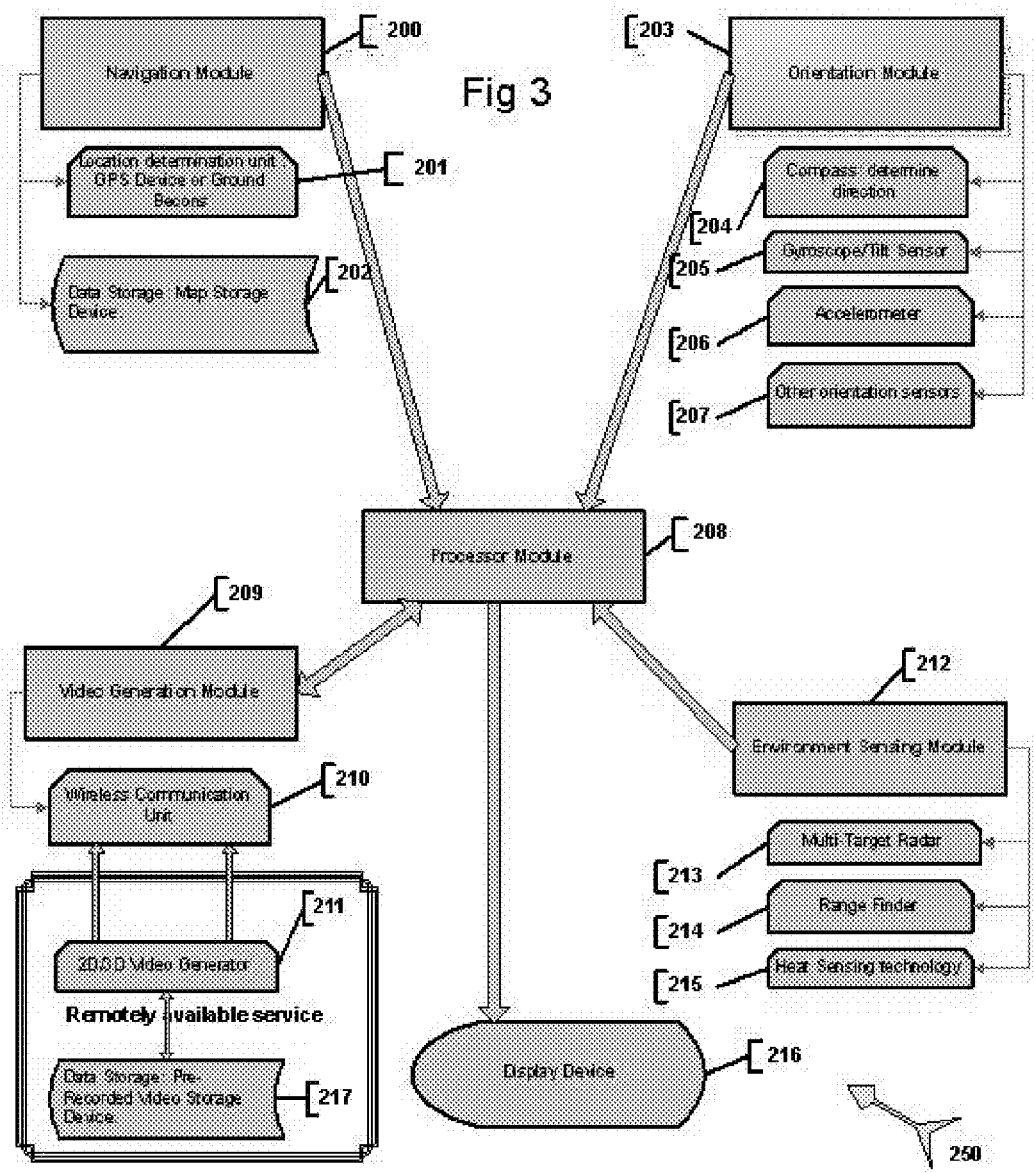
FIG. 3 illustrates a navigation system in accordance with an embodiment of the present invention.

FIG. 3 illustrates a navigation system in accordance with an embodiment. The navigation system may integrate a dynamically generated multidimensional video image, based on current location and directional information, and navigation instructions computed by the navigation module 200. According to one embodiment of the invention, the navigation system may include a navigation module 200 including a location determination device 201, which can be either GPS based, ground beacon based, or DMI (Distance Measurement Instrument), for example. One function of the navigation module is to determine the current location of the navigation system. In an alternate embodiment, the data storage 202, stores navigation map information. Navigation module 200 may also be integrated with processor module 208. The map information, which is used to display the map on the display 216, may be downloaded from a specific site through the Internet and through the wireless communications unit 210 instead of being read out from the storage.

The navigation system illustrated in FIG. 3 may further comprise an orientation module 203. For example, the orientation module 203 may determine directional orientation. The orientation module 203 may include a compass device 204, tilt sensor/gyroscope 205, accelerometer 206, or any other sensor 207 that may be used to determine directional orientation.

The navigation system may also be integrated with an environment sensing module 220 with technologies such as multi-target radar 213, rangefinder 214, laser, heat sensing technology 215, and the like or any combination thereof. Thereby, the environment sensing module 220 may provide information about moving and stationary objects surrounding the location of the navigation system. A processor module 208 may be provided to control and coordinate operations of all modules in the navigation system illustrated in FIG. 3. The information related to objects may include distance, relative or absolute location, size or an object, temperature, etc. Furthermore, the processor module 208 may compute an optimal path from source to target destination and generate navigation instructions corresponding to the optimal path.

The processor module 208 may also integrate generated multidimensional video signals with navigation instructions. Consequently, generated 2D or 3D video signals may be displayed with superimposed navigation instructions. In one embodiment, information about moving or stationary objects in the surrounding may also be superimposed onto the video feed. Thus, the superimposed image may provide a driver with night time visibility.

The processor module may be configured to compute an optimal path from source to target destination and produce navigation instructions for the optimal path. The processor module uses current location information fetched by the location determination unit 201 to read map information from map storage 202. Then, the processor module computes optimal directions and tracks current position relative to computed directions.

The navigation system further embodies video generation module 209, which is in turn comprised of onboard, integrated wireless communication unit 210 and a remote and wirelessly accessible video generator service 211. The wireless communication unit 210 sends a request to the remotely located and wirelessly accessible video generator. In response to the request, a multidimensional video stream is generated in real-time, based on a combination of current location and directional orientation information produced by the navigation and orientation modules and sent as part of the request. The multidimensional video signal is based on at least one pre-recorded source video signal stored in the server 217 providing the generation service. The generated multidimensional video stream is wirelessly fed back to the navigation system through the wireless communication unit 210, which, in turn passes the received generated video feed to the processor module 208 for further processing and for consequent output to the display device 216.

The multidimensional video generator 209 produces video from a plurality of prerecorded multidimensional video feeds, where prerecorded video is captured from at least 2 video cameras from different adjacent locations, covering the same or overlapping space (video is preferably taken at day time). Additionally, each video camera encodes its video with metadata containing location information, time stamp and camera orientation information as well as video camera parameters. A plurality of 2D video streams enhanced with geo information is then stored for future processing or may be supplied in real-time into 3D video generator. It should be understood that the invention is not limited to the above illustrated video generation technology which is cited here for illustration purposes only.

Alternatively, in one exemplary embodiment of the subject matter disclosed herein, a source video feed is pre-processed for removal of all non-stationary objects from source video recording before generating a multidimensional video feed to be displayed to a user. Source 2D video recording is geo-data enhanced with additional metadata, such as, positional and orientation data as well as a timestamp per each recorded frame and video camera parameters. Removal of non-stationary objects from the source video feed can be achieved, for example, by correlating two 2D video recordings either taken from adjacent space at the same time or at different times and determining or identifying non-stationary objects in each source video. Thus, source multidimensional video stored will have a street view (view of surrounding) without non-stationary objects (pristine or clean view). A method for removing stationary objects is disclosed in U.S. Pat. No. 5,627,915.

When a cleared multidimensional video is used as a source video for video generation for any given position and orientation specification, the resulting video will also be pristine and cleared of any non-stationary objects in the view. Coupled with consequent superimposition of navigation instructions and information about non-stationary objects in the vicinity of the navigation system, the navigation system will produces a "live" real view of the surrounding environment.

At night time, or any time with limited visibility conditions, the user of a navigation system implementing the subject matter disclosed herein will have a day light, clear video view of the surrounding environment with superimposed navigation instructions and alternatively superimposed information about surrounding moving objects. For example, a car driver driving through unknown parts of a town or city with limited street illumination at night time, or during day time but in a smoggy and therefore low visibility environment, may use the day light display mode of the navigation system for ease of navigation.

Alternatively, a police car pursuing a suspect into an unknown part of a town or city, at night time, with limited street illumination, may also benefit from this mode of operation. In another example, a military jeep, during military operation on a foreign soil riding through a desert or riding through towns or cities with limited or no illumination at night time may also benefit from the day light mode. In yet another example of the subject matter disclosed herein, a diver diving to the underwater base of an offshore oil drilling platform with limited or no underwater visibility may use the day light mode of navigation. Alternatively, a skydiver diving from high altitude at night time or an airplane pilot may find useful aspects of the present invention such as combining video generation for intermediate position with superimposed navigation or environment information. Thereby, the navigation system alleviates user experience and provides great benefit in the above mentioned or similar circumstances. It will make navigation experience more natural and will alleviate the need for additional mental interpretation of navigation instructions by the user. Another embodiment may include integration of video generation with the environment sensing module, without requiring navigation instructions. In that embodiment the navigation device may be used as an observational tool to make navigation at night time easier.

Figure 4:
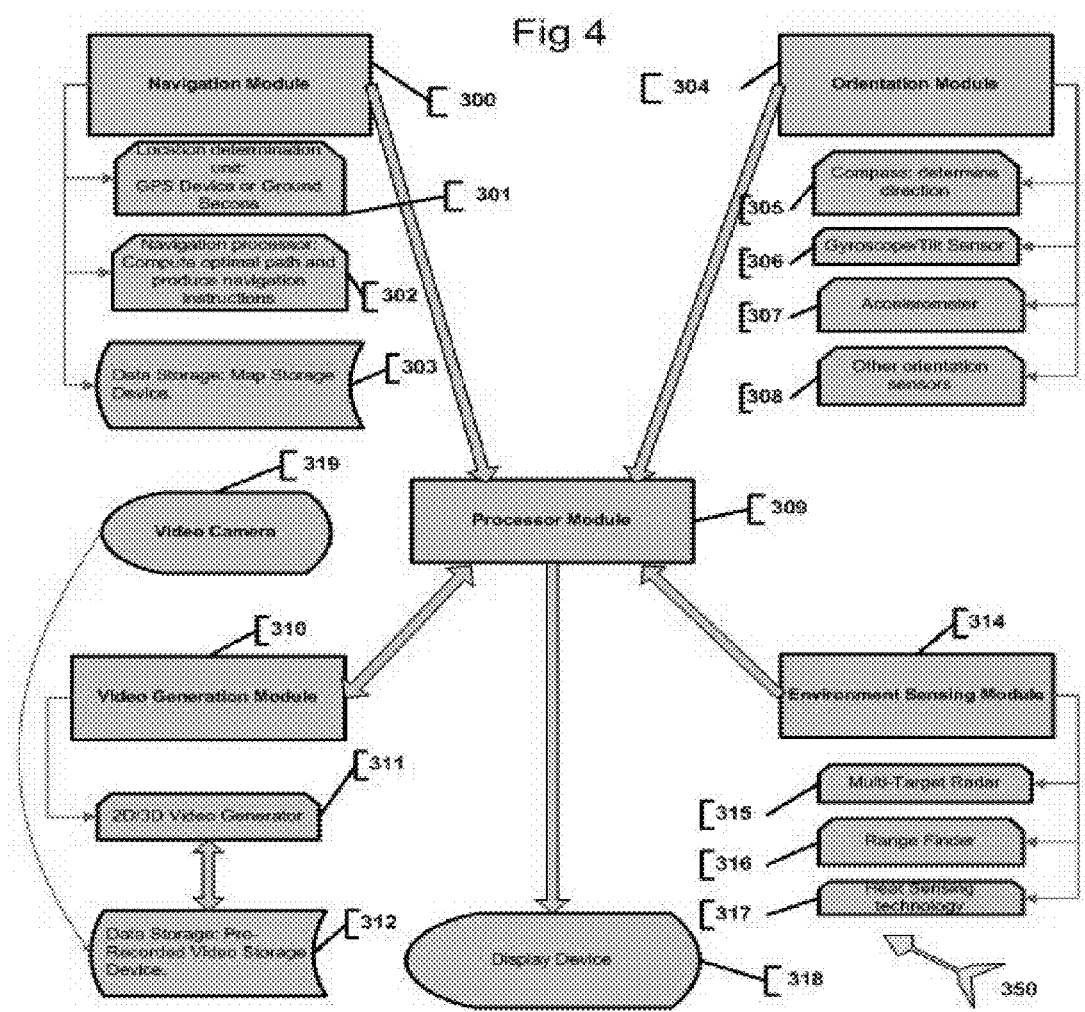
FIG. 4 illustrates an alternate embodiment of the navigation system of the present invention.

FIG. 4 illustrates another embodiment of the navigation system. In the illustrated embodiment of the navigation system may include the following components: a navigation module 300, a location determining unit 301, data storage 303, an orientation module 304, a compass 305, a gyroscope/tilt sensor 306, an accelerometer 307, other orientation sensors 308, an environment sensing module 314, a multi-target radar 315, a range finder 316, heat sensing technology 317, and a display device 318. Each of these components may be the same or substantially similar as corresponding components of the embodiment illustrated in FIG. 3 as described above. A navigation processor 302 for computing an optimal path and producing navigation instructions may be further provided as a component of navigation module 300. In the illustrated embodiment of FIG. 4, the video generation module 310 includes an onboard multidimensional video generator 311 and onboard, integrated data storage of pre-recorded source video(s). The video generation module is arranged to generate multidimensional video views for requested locations and directional orientation by reading source video feeds from data storage 312. The pre-recorded source videos correspond to the space adjacent to the current location. The computer or processor executes a set of instructions that are stored in one or more storage elements, in order to process input data. The storage elements may also store data or other information as desired or needed. The storage element may be in the form of an information source or a physical memory element within a processing machine.

Furthermore, the navigation system is equipped with a video camera 319 (either integrated with the navigation system or external to the navigation system). The video camera may be used to record source videos during day time. Further, the source video feed may be pre-processed, enriched and GEO enhanced by the processor module 309, with geo metadata such as location information, time, or orientation information or camera parameters. The enriched source video is stored in the video storage device 312 to be used for future video generation by video generator 311. Alternatively, the video feed may alternatively be processed, enriched, and GEO enhanced by a video camera.

Processor module 309 may function as a primary controller of the function of all components of proposed navigation system, whereas processor may control, coordinate and unify functions of all included components.

Video generation module 310 or processor module 309 may also take an input from environment sensing module 314 for superimposition of the environment information onto generated multidimensional video signal. Environment sensing module 314 may comprise multi-target radar 315, rangefinder 316, laser, heat sensing technology 317, any combination thereof. The environment sensing module 314 may provide information about moving and stationary objects surrounding the location of the navigation and may allow classification of objects observed. Information related to objects may include distance, relative or absolute location, size or an object, temperature, etc. A processor module 309 may be provided to control and coordinate operations of all modules in the navigation system 350. The processor module 309 may compute an optimal path from a source to a target destination and generate navigation instructions corresponding to an optimal travel path.

In an alternate embodiment, the processing module may be configured to superimpose, inter alia, navigation directions and navigation instructions onto a generated video feed. For example, the view with superimposed navigation directions and navigation instructions may depict navigation instructions in proper proportion and with respect to spatial relationship relative to different parts of the generated video image.

Figure 5:
FIG. 5 illustrates the display of the navigation system in accordance with an embodiment of the present invention.

FIG. 5 further illustrates the display of the navigation system in accordance with an embodiment. According to one embodiment, a display of the navigation system displays a still snapshot of the generated video for a given location and directional orientation. The display may show directional information. For example, the directional information may comprise an arrow that is superimposed onto the generated video. In an alternate embodiment, the navigation directions may be superimposed independent of spatial proportions and correlation.

An additional embodiment is illustrated in FIG. 6, which may include components which are the same or similar to components previously described in the other illustrated embodiments, which may include: a navigation module 400, a location determining unit 401, data storage 402, an orientation module 403, a compass 404, a gyroscope/tilt sensor 405, an accelerometer 406, other orientation sensors 407, an environment sensing module 413, a multi-target radar 414, a range finder 415, heat sensing technology 416, and a display device 417. Each of these components may be the same or substantially similar as corresponding components of the embodiments illustrated in FIGS. 3 and 4 as described above. In the embodiment illustrated in FIG. 6, the video generation module 409 may include an onboard, integrated wireless communication unit 410 and an integrated, onboard multidimensional video generator 411. The communication unit is further arranged to wirelessly fetch a plurality of prerecorded source videos from a remotely, wirelessly available video storage 420. The remote video storage services requests from the wireless communication unit by sending back a plurality of prerecorded multidimensional video stream(s) corresponding to the space adjacent to the location coordinates derived from the navigation module. Prerecorded multidimensional video streams may be used as the source video feed for further video generation in the multidimensional video generator 411. Source video can be fetched over one, two or more communication channels via communication unit. Video generator 411 consequently generates video for current location and current directional orientation. The video generator may generate 3D videos based on 2D source video signals.

The processor module 408 may also integrate generated multidimensional video signals with navigation instructions. Consequently, generated 2D or 3D video signals may be displayed with superimposed navigation instructions. In one embodiment, information about moving or stationary objects in the surrounding vicinity may also be superimposed onto the video feed. Thus, the super imposed image may provide a driver with night time visibility.

Processor module 408 may take an input from environment sensing module 413 for superimposition of the environment information onto generated multidimensional video signal. Environment sensing module 413 may comprise multi-target radar 414 (or, alternatively, another type of radar known or to be developed), rangefinder 415, laser, heat sensing technology 416, and the like or any combination thereof or any other know technology enabling night vision and enabling object recognition in the vicinity of the navigation system and may allow to classify objects observed. A processor module 408 may be provided to control and coordinate operations of all modules in the navigation system. The information related to objects may include distance, relative or absolute location, size of an object, temperature, etc. Furthermore, the processor module 408 may compute an optimal path from source to target destination and generate navigation instructions corresponding to an optimal travel path.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter disclosed herein without departing from its scope. Many other embodiments will be apparent to those of skill in the art upon reviewing the above description. The scope of the subject matter disclosed herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the subject matter disclosed herein, including the best mode, and also to enable any person skilled in the art to practice the various embodiments of the subject matter disclosed herein, including making and using any devices or systems and performing any incorporated methods. The patentable scope of the various embodiments of the subject matter disclosed herein is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A navigation system comprising:
   a location determination module for determining a location of the navigation system;
   an orientation module for determining directional orientation of said navigation system;
   a video generation module for outputting a multidimensional video signal generated based on a plurality of prerecorded source video signals and said location and orientation of said user; and
   a display module to display said generated multi-dimensional video signal overlaid with navigation directions or environment information related to the environment in the vicinity of said navigation system,
   wherein the video generation module outputs an updated multi-dimensional video signal as the location of the navigation system changes, the display thereby changing as the location of the navigation system changes.

2. The system of claim 1, further comprising a communications unit for sending a request to a remote video generation server, the request including said location and orientation information, and for receiving from said server said multidimensional video signal generated based on the plurality of prerecorded source video signals and said sent location and orientation information.

3. The system of claim 1, further comprising a communications unit for sending a request to a remote server, the request including said location and orientation information, and for receiving from said server said at least one source video signal pre-recorded in said remote server; wherein the video generation module generates said multidimensional video signal generated based on the plurality of prerecorded source video signals and said location and orientation information.

4. The system of claim 1, further comprising a storage module for prerecording of said plurality of source video signals and sending said prerecorded source video signals to the video generation module, wherein the video generation module generates said multidimensional video signal generated based on the plurality of prerecorded source video signals and said location and orientation information.

5. The system of claim 1, wherein the overlaid navigation directions or environment information related to the environment in the vicinity of said user is such that the position of navigation directions or environment information are in proportional spatial relationship with respect to corresponding parts of the generated multidimensional video signal.

6. The system of claim 1, further comprising: a navigation module for computing said navigation instructions; an environment sensing module for detecting said environment information; and a processing module for superimposing navigations instructions or environment information onto the generated multidimensional video signal to create said overlaid video signal and sending the overlaid video signal to the display module.

7. The system of claim 6, further comprising a video camera for providing the plurality of source video signals, and wherein said plurality of source video signals is geo enhanced by associating location information and orientation information with at least one frame in the source video signals provided by the camera; the system further comprising a storage module for storing said at least one geo enhanced source video signal.

8. The system of claim 7, wherein the processing module processes the geo enhanced source video signal to remove data corresponding to stationary objects from said geo enhanced source video signal.

9. The system of claim 1, wherein the location information is based on information or signals provided by at least one of a GPS unit, ground based beacons, or distance measurement sensors.

10. The system of claim 1, wherein the at least one source video signal is geo enhanced.

11. The navigation system of claim 1, wherein the video generation module processes the plurality of prerecorded source video signals into a 3D data set including both color data and spatial data; and wherein the multidimensional video signal is generated based on the 3D data set.

12. A method for navigation comprising:
obtaining location information from location determination module;
obtaining directional orientation information from an orientation module;
generating a multi-dimensional video signal based on a plurality of prerecorded source video signals and the location and directional information;
superimposing over the generated multi-dimensional video signal navigation instructions or environmental information about current environment around the navigation device;
displaying the generated video signal with the superimposed navigation instructions or environment information,
wherein the generated multi-dimensional video signal is updated as the location of the navigation system changes, and the displayed generated video signal thereby changing as the location of the navigation system changes.

13. The method of claim 12, further comprising:
sending a request to a remote video generation server, the request including said location and orientation information, and
receiving from said server said multidimensional video signal generated based on the plurality of prerecorded source video signals and said sent location and orientation information.

14. The method of claim 12, further comprising:
sending a request to a remote server, the request including said location and orientation information, and
receiving from said server said plurality of source video signals pre-recorded in said remote server.

15. The method of claim 12, further comprising:
sending said prerecorded source video signals, to a video generation module, wherein the video generation module generates said multidimensional video signal, based on the plurality of prerecorded source video signals and said location and orientation information.

16. The method of claim 15, wherein the step of superimposing the generated multidimensional video signal occurs on a cloud server, and the method further comprising sending the generated video signal with the superimposed navigation instructions or environment information from the cloud server to a display.

17. The method of claim 12, wherein the overlaid navigation directions or environment information related to the environment in the vicinity of said user is such that the position of navigation directions are in proportional spatial relationship with respect to corresponding parts of the generated multidimensional video signal wherein the plurality of source video signals are geo enhanced.

18. The method of claim 12, wherein the step of determining the location information is based on information or signals provided by at least one of a GPS unit, ground based beacons, or distance measurement sensors.

19. The method of claim 12 further comprising geo enhancing the plurality of source video signals.

20. The method of claim 12, further comprising removing data corresponding to stationary objects from the generated video signal.

* * * * *